Dec. 21, 1965   H. L. SCHULZE   3,224,823
KNOCKDOWN SHOWCASES
Filed Jan. 8, 1962   6 Sheets-Sheet 1

INVENTOR.
HOWARD L. SCHULZE
BY
Alfred W. Petchaft
ATTORNEY

Dec. 21, 1965   H. L. SCHULZE   3,224,823
KNOCKDOWN SHOWCASES
Filed Jan. 8, 1962   6 Sheets-Sheet 2

INVENTOR.
HOWARD L. SCHULZE
BY
ATTORNEY

Dec. 21, 1965 H. L. SCHULZE 3,224,823
KNOCKDOWN SHOWCASES
Filed Jan. 8, 1962 6 Sheets-Sheet 3

INVENTOR.
HOWARD L. SCHULZE
BY
ATTORNEY

Dec. 21, 1965   H. L. SCHULZE   3,224,823
KNOCKDOWN SHOWCASES
Filed Jan. 8, 1962   6 Sheets-Sheet 4

INVENTOR.
HOWARD L. SCHULZE
BY
*Alfred W. Petchaft*
ATTORNEY

Dec. 21, 1965  H. L. SCHULZE  3,224,823
KNOCKDOWN SHOWCASES
Filed Jan. 8, 1962  6 Sheets-Sheet 5

INVENTOR.
HOWARD L. SCHULZE
BY
ATTORNEY

Dec. 21, 1965    H. L. SCHULZE    3,224,823
KNOCKDOWN SHOWCASES
Filed Jan. 8, 1962    6 Sheets-Sheet 6

INVENTOR.
HOWARD L. SCHULZE
BY
ATTORNEY

United States Patent Office
3,224,823
Patented Dec. 21, 1965

3,224,823
KNOCKDOWN SHOWCASES
Howard L. Schulze, Des Plaines, Ill., assignor to American Fixture, Inc., St. Louis, Mo., a corporation of Missouri
Filed Jan. 8, 1962, Ser. No. 164,698
18 Claims. (Cl. 312—108)

This invention relates in general to certain new and useful improvements in store fixtures, and, more particularly, to display showcases for use in retail stores and similar business establishments, and which are capable of being rapidly assembled and, therefore, can be conveniently stored or shipped in relatively compact or so-called "knockdown" form.

Practically all department stores and similar retail merchandising outlets utilize glass showcases for displaying the merchandise which is to be sold. Up to the present time, it has been the general practice in the industry to manufacture and ship display cases in fully assembled form. This, of course, not only adds materially to the cost of manufacture but also increases packaging and shipping costs.

In addition to this, the setting up of a new store requires a great deal of time and effort in planning the floor layout for the installation of conventional merchandise display equipment and fixtures. Thus, it is desirable to provide some suitable type of "knockdown" structure which lends itself readily to modular design and easy set-up at point of use.

It is, therefore, the primary object of the present invention to provide a showcase or display case which can be rapidly assembled and disassembled.

It is another object of the present invention to provide a showcase of the type stated which can be rapidly assembled or disassembled with a minimum of labor and without a need for special types of tools or equipment.

It is a further object of the present invention to provide a showcase of the type stated which can be compactly packaged to achieve economy in shipping.

It is an additional object of the present invention to provide a showcase of the type stated which can be assembled from a limited number of basic components or modules so that various lengths and sizes can be employed.

It is also an object of the present invention to provide a showcase of the type stated which is light in weight, sturdy in construction, and capable of withstanding the abuse to which it is subjected by retail customers.

With the above and other objects in view, my invention resides in the novel features of form, construction, arrangement, and combination of the parts presently described and pointed out in the claims.

In the accompanying drawings (six sheets)—

Referring now in more detail and by reference characters to the drawings, which illustrate the practical embodiments of the present invention, A designates a knockdown showcase comprising a pair of spaced oppositely presented transverse end frames 1, 2, which are connected at their forward and rearward margins by front and back lengthwise extending facia boards 3, 4, respectively.

Figure 12:
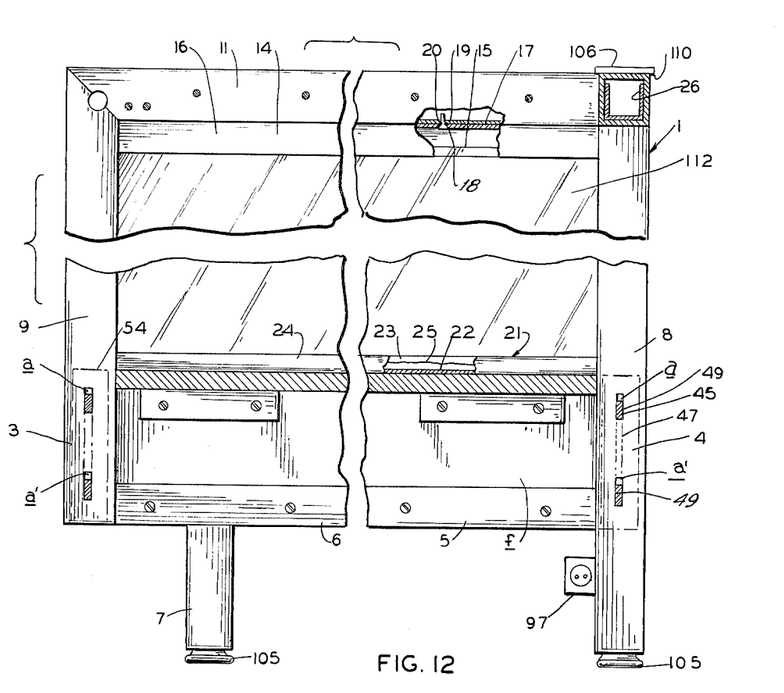
FIGS. 12 and 13 are transverse sectional views taken along lines 12—12 and 13—13, respectively, of FIG. 1.
Figures 13, 14:
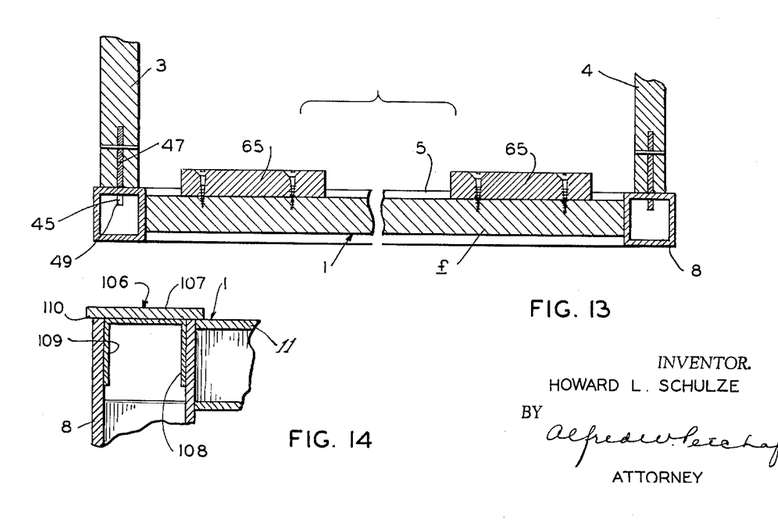
FIG. 14 is a fragmentary sectional view taken along line 14—14 of FIG. 1.

The left end frame 1 comprises a side wall support 5 having an outwardly extending flange 6 integrally formed at its lower margin. Welded to the underside of the flange 6 and spaced inwardly from its forward margin is a front leg 7 and welded to the rear vertical margin of the side wall 5 is a back leg or upright 8 which extends above the upper margin of the side wall 5. Welded to the forward margin of the side wall 5 and terminating at its lower margin is a front upright 9 which is sized for cooperation with the back upright 8. The front upright 9 is beveled adjacent its upper margin at a 45° angle. Welded to the back upright 8 adjacent its upper end is a side rail 11 which is, in turn, beveled at its forward margin for welding to the complementary beveled end of the front upright 9. The front leg 7, the uprights 8, 9, and the side rail 11 are preferably fabricated from steel tubing of rectangular cross-section. The side wall support 5 is preferably fabricated from a suitable piece of structural metal having an L-shaped cross-section. The back and front uprights 8, 9, are provided on their inwardly presented faces (reference being made to FIG. 12) with pairs of slot-like apertures $a$ and $a'$, respectively. These slot-like apertures $a$ and $a'$ are arranged in a uniformly spaced configuration along the centerlines of the lateral faces on which they are punched. Bolted or otherwise rigidly secured to the side wall support 5 and supported by an outwardly extending flange 6 is a side wall facia board $f$. Welded or otherwise rigidly secured to the inwardly presented transverse surface of the side rail 11 is an inverted L-shaped glass-supporting bracket 12, integrally including an inwardly extending glass-supporting flange 13. Rigidly secured to the underside of the side rail 11 and extending lengthwise thereof is an upper U-shaped glass-supporting channel 14 including depending flanges 15, 16, integrally connected by a bight portion 17. The bight portion 17 and the underface of the side rail 11 are provided with matching aligned apertures 18, 19, for accommodating sheet metal screws 20. Provided for cooperation with the glass-supporting channel 14 and bolted to the upper margin of the side wall facia board $f$ is a lower U-shaped glass-supporting channel 21 having a glass retaining groove 22 defined by upwardly extending flanges 23, 24, which are integrally connected by a bight portion 25. Welded to the inwardly presented surface of the back upright 8 adjacent its upper margin is a tongue insert 26 which is preferably formed of a piece of steel having a U-shaped cross-section.

The right end frame 2 is provided for cooperation with the left end frame 1 and is spaced a distance therefrom equal to the length of the lengthwise extending facia boards 3, 4. The right end frame 2 is substantially similar to the left end frame 1 and, in effect, is a mirror image thereof. The right end frame 2 also includes a right side wall support 27 having an integrally formed outwardly extending support flange 28 as its lower margin, and welded to the underside of the flange 28 and spaced inwardly from the forward margin is a front leg 29. Welded to the rearward margin of the side wall support 27 is a vertically extending leg or upright 30, and welded to the forward margin of the side wall support 27 is a vertical upright 31, the side wall support 27, the leg 29, and the uprights 30, 31, being substantially similar to the previously described side wall support 5, front leg 7, and uprights 8, 9. Extending between and welded to the uprights 30, 31, adjacent their upper margins is a side rail 32, attached in the manner previously described, to said top rail 11. Welded to the inwardly presented surface of the side rail 32 is a glass-top support bracket 33 integrally including an inwardly extending support flange 34. Bolted or otherwise secured to the side wall support 27 and supported by the flange 28 is a side wall facia board f' which is substantially identical to the previously described side wall facia board f. Rigidly secured to the underside of the side rail 32 by means of sheet metal srews 35 is an upper U-shaped glass-supporting channel 36 which is substantially identical to the previously described glass-supporting channel 14, and provided for cooperation with the glass-supporting channel 36 and secured to the upper margin of the side wall facia board f' by means of sheet metal screws 38 is a cooperating lower U-shaped glass-supporting channel 39, which is substantially identical to the previously described glass-supporting channel 21. Welded to the inwardly presented surface of the upright 30, adjacent its upper margin, is a tongue insert 40 which is substantially identical to the previously described tongue insert 26. Each of the back and front uprights 30, 31, is provided with two rectangular slot-like apertures 41, 41', respectively, which are substantially identical to the previously described slot-like apertures a, a', respectively.

The two end frames 1, 2, are lengthwise connected at their rearward margin by the back wall facia board 4 which is preferably fabricated of a piece of lumber or plywood and is of rectilinear shape, having any desired length and height, and includes a top edge face 42 and laterally presented side faces 43, 44. The inner laterally presented side faces of uprights 8 and 30 are centrally kerfed for snugly receiving metal clamp hooks 45, 46, having rectilinear head plates 47, 48, respectively, and each including a pair of vertically spaced hook fingers 49, 50, which are adapted to be press-fitted into the slots a and a', 41 and 41', respectively. Rigidly secured to the top edge face 42 is a double-track glass-supporting channnel 51 including two parallel aligned U-shaped trackways 52, 53, and which are adapted to receive sliding glass doors.

The end frames 1, 2, are connected at their forward margins by the facia board 3 which is substantially identical to the back facia board 4 and includes a top edge face 54 and laterally presented side faces 55, 56. Also mounted on the lateral side faces 55, 56, are clamp-hooks 57, 58, which are identical to the previously described clamp-hooks 45, 46, each respectively having head plates 59, 60, the plates 59, 60 integrally including hook fingers 61, 62, respectively which are adapted to be press-fitted within the slot apertures a and a', and 41 and 41', respectively. Rigidly secured to the top edge face 54 by means of sheet metal screws 63 is a U-shaped glass-support channel 64 which extends lengthwise of the side wall facia board 3, and is substantially identical to the previously described glass-supporting channels 21, 39.

Bolted or otherwise rigidly secured to the inwardly presented vertical faces of the side wall facia boards f, f', and the lengthwise extending facia boards 3, 4, are inwardly extending co-planar base supporting blocks 65, which are adapted to support a substantially rectilinear wooden base 66. The base 66 is furthermore provided at its rearward margin with a plurality of rectangular recesses 67.

Connecting each of the rear vertical uprights 8, 30 at their upper margin is a lengthwise extending back cross-bar 68, preferably fabricated from steel tubing of rectangular cross-section. The tubing should be of such cross-sectional size so that the tongue inserts 26, 40, can be slidably disposed within each open end of the cross-bar 68 and frictionally engage the interior surfaces thereof. Rigidly secured to the undersurface of the cross-bar 68 by means of sheet metal screws 69, and extending longitudinally thereof, is a double-track glass door supporting channel 70 which lies in the same vertical plane as, and is adapted for cooperation with the double-track channel 51 mounted on the facia board 4, the glass-supporting channel 70 having two U-shaped parallel extending trackways 71, 72. Welded or otherwise rigidly sesured to the interior surface of the cross-bar 68 and extending lengthwise thereof is an inverted L-shaped glass-top supporting bracket 73 including an inwardly extending glass-supporting flange 74 integrally formed at its upper margin.

Provided for removable attachment to the inwardly presented lateral side face of the transversely extending left side rail 11, by means of sheet metal screws 75, is a support bracket 76 having an integrally formed inwardly extending support flange 77 adjacent its upper margin. Similarly provided for removable attachment to the inwardly presented side face of the side rail 32 adjacent its forward margin by means of sheet metal screws 78 is a support bracket 79 having an inwardly extending flange 80, the bracket 79 being spaced for cooperation with the bracket 76. A front cross-bar 81, preferably fabricated from steel having a T-shaped cross-section, includes a vertical wall 82 with an integrally formed inwardly extending flange 83 sized for lengthwise disposition between the end frames 1, 2, and is adapted for bolted attachment to the inwardly extending flanges 77, 80, by means of bolts 84. In this connection, it is to be noted that the inwardly extending flange 83 forming part of the front cross-bar 81 is co-planar with and cooperates with the inwardly extending flanges 13, 34, and the flange 74 to provide a horizontal glass-top support. Provided for attachment to the underside of the flange 83 by means of bolts 85 is a lengthwise extending light-bar 86 including two side walls 87, 88, which are integrally connected at their upper margins by a top wall 89, the top wall 89 being adapted to lie in flushwise engagement with the underside of the flange 83. The side walls 87, 88, are provided with inturned flanges 90, 91, at their lower margins for supporting an optional glass light-diffuser 92.

The light-bar 86 is preferably fitted with a lengthwise extending fluorescent bulb b and is provided at its transverse end abutting end frame 1 with a connector plug 93. The vertical upright 9 is provided on its inwardly presented lateral side face with an aperture 94 which houses a socket 95 for electrically accommodating the plug 93. The left end frame 1 is pre-wired to include a junction socket 97 mounted below the flange 6 on the inwardly presented face of the upright 8. The conductor 96 electrically connects the socket 97 to the socket 95. Mounted on the underside of the base 66 is a ballast-box 98 including a conductor 99 having a plug 100 which is adapted for electrical connection with the socket 97. The ballast-box 98 is further provided with an electrical conductor 101 for electrical connection to a source of electrical current. In this connection, it is to be noted that the ballast-box 98 and the electrical circuitry of the light-bar 86 are conventional and, therefore, neither are illustrated nor described in detail herein.

Provided for bolted attachment to the inwardly presented surface of the back facia board 4 and the inwardly presented surface of the top cross-bar 68 is a plurality of longitudinally spaced bracket supports 102 preferably fabricated from steel tubing having a rectangular cross-section. The lower portion of the bracket 73 is provided with a relief recess 103 for accommodating the upper ends of bracket supports 102. The bracket supports 102 are centrally punched on their inwardly presented surface to form a series of vertically spaced slot-apertures 104 for accommodating conventional shelf-supporting brackets (not shown).

Also provided for cooperation with the legs 7, 8, 29, 30, are four substantially identical glide inserts 105. Provided for closurewise insertion within the open ends of the rear uprights 8, 30, are two identical end caps 106 which include a horizontal top wall 107 which merges integrally into two spaced parallel depending side walls 108, 109, the horizontal top wall 107 being somewhat larger in peripheral shape than the cross-sectional size of the depending walls 108, 109, so as to form an angular bead 110 which extends over the top edges of the uprights 8, 30. The side walls 108, 109, are further provided with rectangular grooves 111 extending upwardly from their lower margins and terminating below the top wall 107.

Finally, glass panels 112, 113, are provided for cooperation with the end-frames 1, 2, respectively. The glass panel 112 is sized to fit snugly against the uprights 8, 9, and has a vertical height slightly less than the distance between the two bight portions of the glass supporting channels 14, 23, whereby the glass panel 112 can be pushed upwardly between the flanges 15, 16, until the upper margin of the glass abuts the downwardly presented surface of the bight 17 within the channel 14. Thereupon, the glass panel 112 can be dropped into the lower cooperating glass-support channel 23. The upper margin of the glass insert 112 will be slightly spaced from the bight 17 but will be retained within the channel 14 by the relatively deep flanges 15, 16. Similarly, the glass insert 113 is inserted into the upper glass-supporting channel 36 and then lowered into the cooperating glass-supporting channel 39. In like manner, a glass insert 114 is inserted between the vertical wall 82 of the front cross bar 81 and the back wall 88 of the light-bar 86 until the upper margin of the glass insert 114 abuts the downwardly presented surface of the flange 83. Thereupon, the glass insert 114 is dropped into the glass-supporting channel 64 formed on the front wall facia board 3. Finally, glass doors 115, 116, are inserted in like manner in each of the upper trackways 71, 72, and dropped into the lower cooperating trackways 52, 53. In this connection, it is to be noted that the glass doors 115, 116, have a length equal to approximately one-half of the length of the back wall facia board 4 and are slidably mounted within each of the respective trackways, thereby functioning as sliding doors, providing easy access to the interior portions of the showcase A. The glass doors 115, 116, can preferably be provided with conventional knobs or handles 117, 118, respectively. Finally, a horizontal glass top insert 119 is placed on, and supported by, the cooperating inwardly extending flanges 13, 34, and 74, 80. The glass insert 119 is provided with a suitable thickness so as to fit flushwise with the upper surface of each of the side rails 11, 32, and the cross-bars 68, 81.

Figures 1, 2:
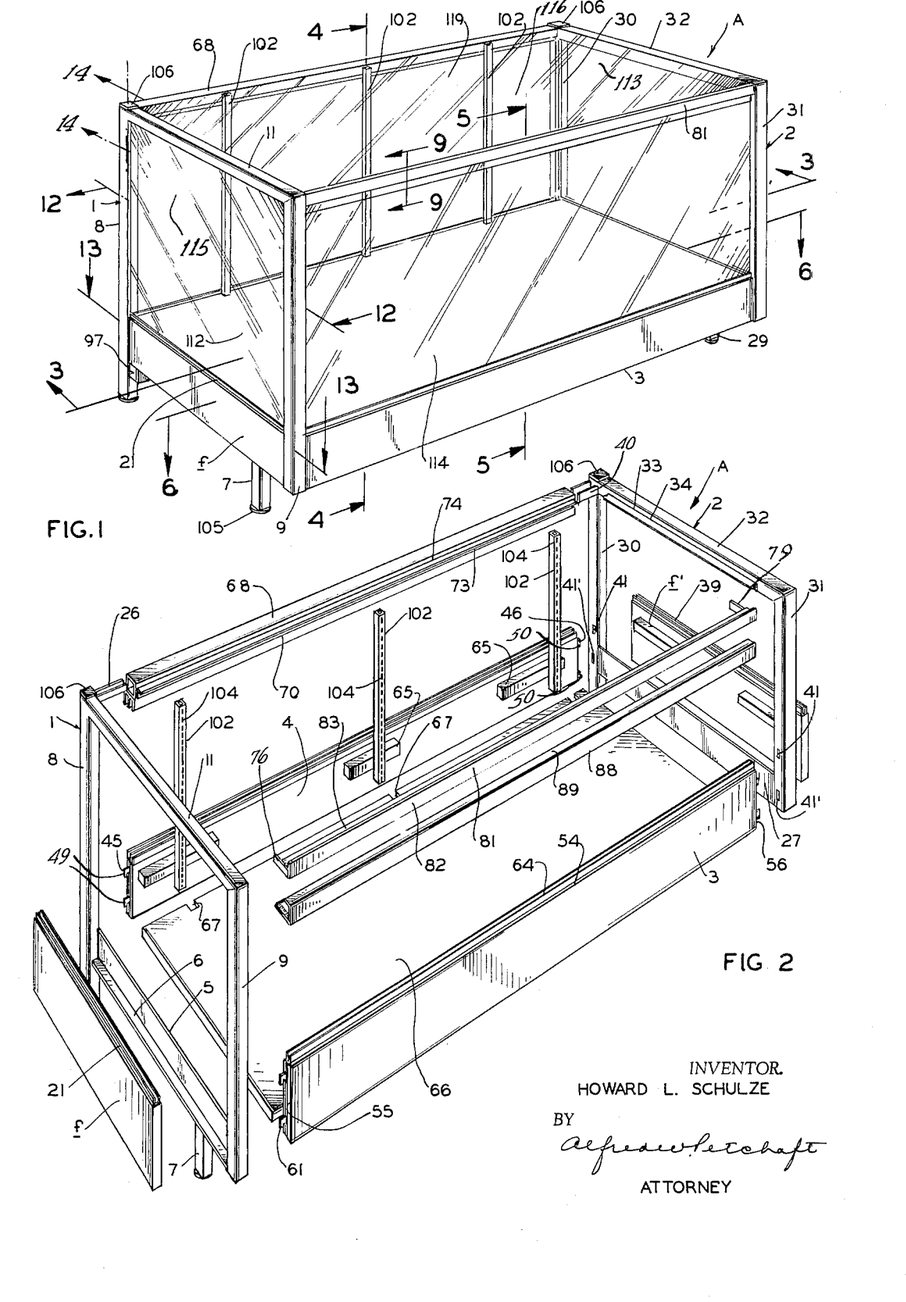
FIG. 1 is a perspective view of a display case constructed in accordance with and embodying the present invention.
FIG. 2 is an exploded view of the display case shown in FIG. 1.
Figure 3:
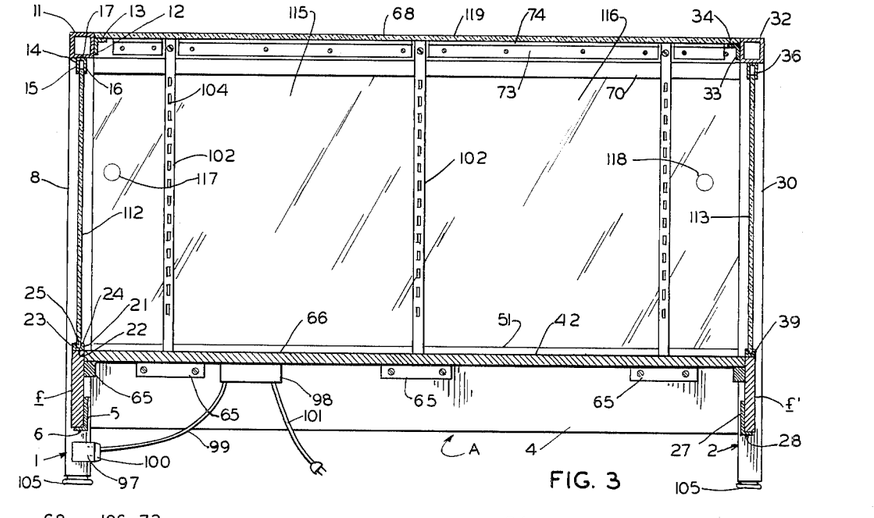
FIG. 3 is a transverse sectional view taken along line 3—3 of FIG. 1.
Figure 4:
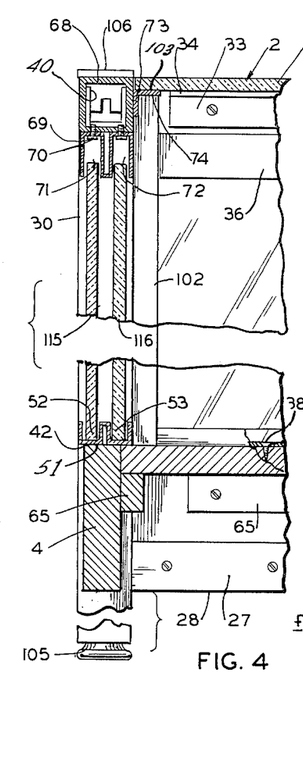
FIGS. 4, 5, and 6, are fragmentary sectional views taken along lines 4—4, 5—5, and 6—6, respectively, of FIG. 1.
Figures 5, 11:
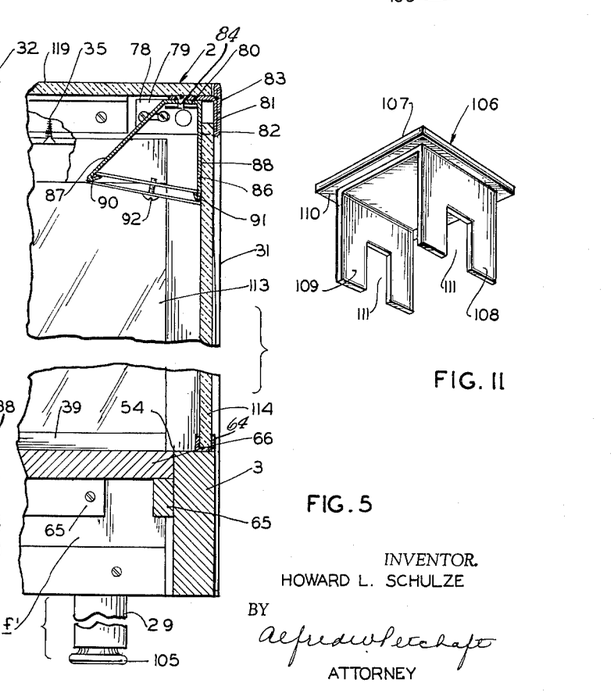
FIG. 11 is a perspective view of the cap member or element forming a part of and utilized in the present invention.
Figure 6:
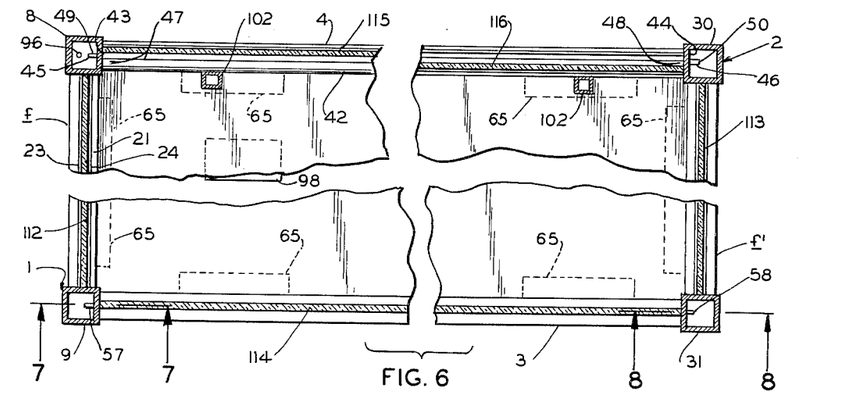
Figure 7:
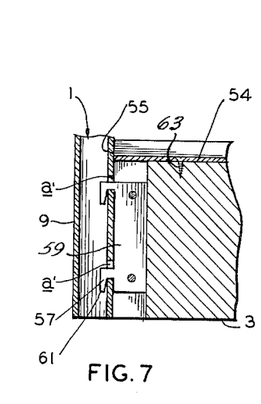
FIGS. 7 and 8 are fragmentary sectional views taken along lines 7—7 and 8—8, respectively, of FIG. 6.
Figure 8:
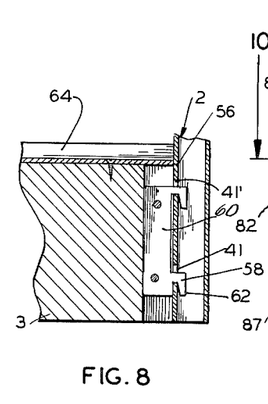
Figure 9:
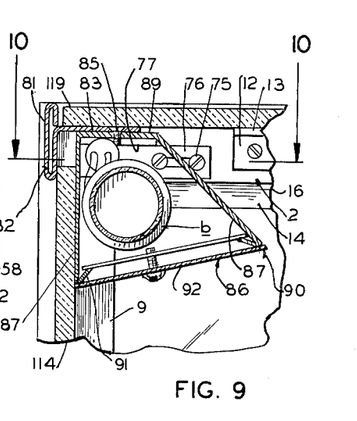
FIG. 9 is a fragmentary sectional view taken along line 9—9 of FIG. 1.
Figure 10:
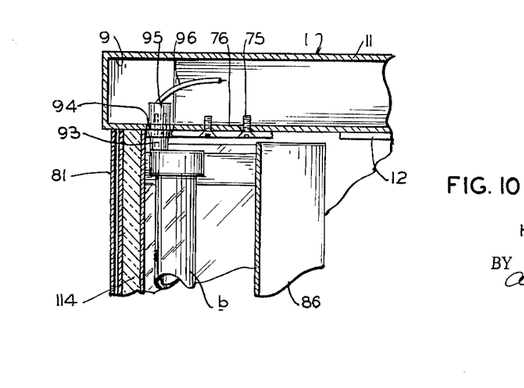
FIG. 10 is a fragmentary sectional view taken along line 10—10 of FIG. 9.

It should be obvious that the various disassembled components of the knockdown showcase A can be packaged and stored in a compact unit, the various sections being rather light in weight, and easily transportable. When it is desired to assemble the knockdown showcase A, the two end-frames 1, 2, which are in the completely assembled form, are connected at their upper margins to the back cross-bar 68, by inserting the tongue inserts 26, 40, into the open ends of the cross-bar 68. The tongue inserts 26, 40, are sized to frictionally engage the interior walls thereof and remain securely seated therein. The front facia board 3 and the back facia board 4 are connected to the forward and rearward ends respectively of the end-frames 1, 2, by inserting the clamp-hooks 57, 58, and 45, 46, into the elongated slot-like apertures a, a', and 41, 41', respectively, while holding the end-frames 1, 2, substantially vertical, thereby forming a rectangular self-standing unit, substantially as shown in FIG. 2. Thereupon, the brackets 76, 79, are bolted to the inwardly presented surface of each of the side rails 11, 32, respectively, by means of sheet metal screws 75, 78. The front cross-bar 81 is then secured to each of the flanges 77, 80, by means of bolts 84. The light-bar 86 is then fastened to the under side of the flange 83 by means of bolts 85 and the plug 93 is inserted into the socket 95. At this point, the base 66 is inserted within the rectangular casing and supported by each of the base-supporting blocks 65. The bracket supports 102 are then secured to the interior faces of the facia board 4 and the back cross-bar 68. The bracket supports 102 of course, clear the base 66 through the recesses 67 formed therein and clear the bracket 73 at the recess 103. The cap members 106, if not already inserted, are then disposed within the open ends of the uprights 8, 30.

The glass inserts 112, 113, are, thereupon, inserted into the end-frames 1, 2, respectively, in the manner as previously described. Similarly, the glass insert 114 is inserted in the front cross-bar 81 and the front facia board 3. The sliding glass doors 115, 116, are then inserted in the respective trackways 52, 71, and 53, 72, in the manner as previously described and, lastly, the upper horizontal glass top is placed upon and supported by each of the inwardly presented flanges 13, 34, and 74, 80.

The electrical conductor 99 is then plugged into the junction socket 97 and the conductor 101 is connected to some suitable source of electrical current for supplying current to the light-bar 86. It should also be obvious that conventional shelf-supporting brackets and shelves (not shown) may be connected to the bracket-supports 102 for displaying merchandise.

It will, of course, be understood that the sequence of assembly operations can be varied according to the convenience and wishes of the person doing the assemblying, and it is not essential that the sequence of assembly be followed in the precise order as above-described.

Figure 15:
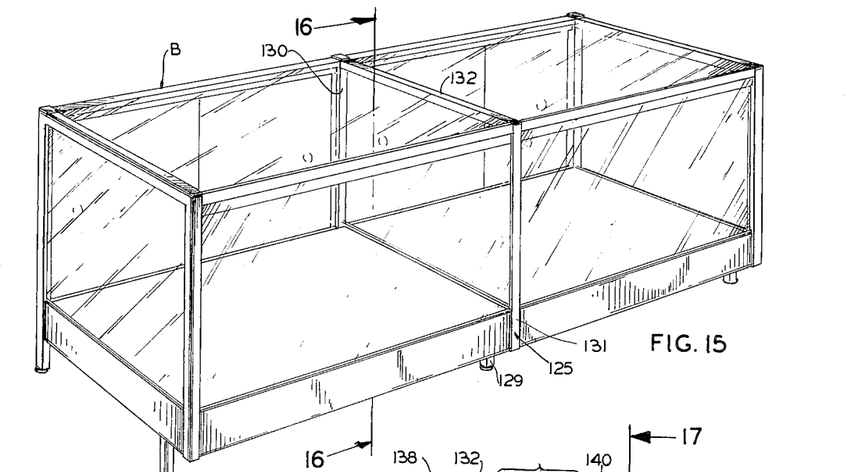
FIG. 15 is a perspective view of a modified form of display case constructed in accordance with and embodying the present invention.
Figures 16, 17, 18, 19:
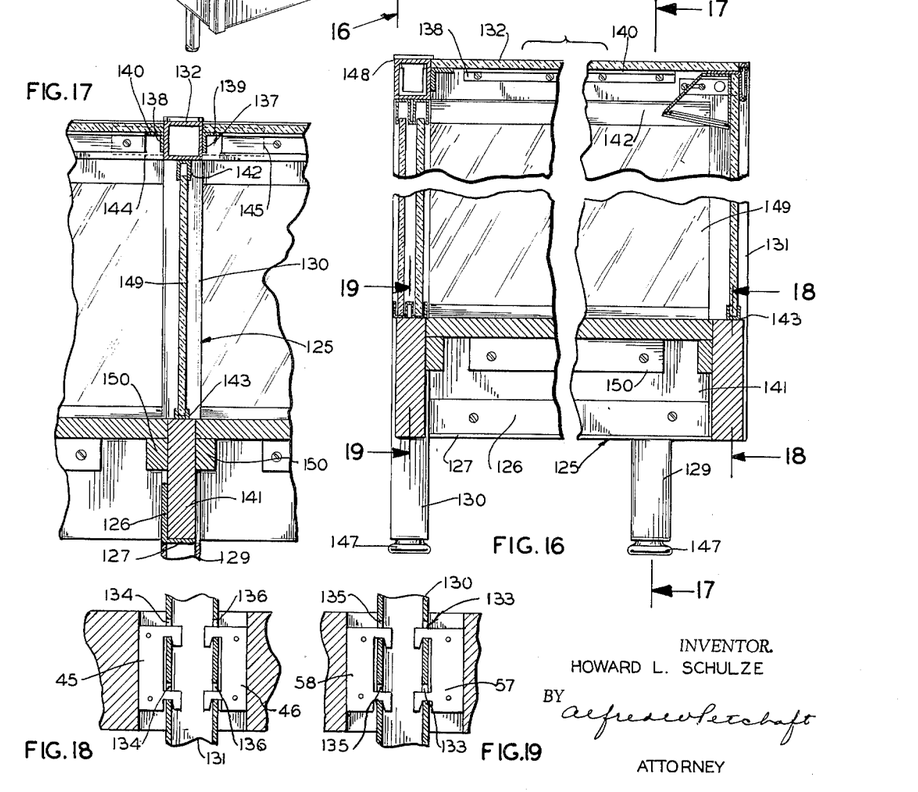
FIG. 16 is a fragmentary vertical sectional view taken along line 16—16 of FIG. 15.
FIGS. 17, 18, and 19, are fragmentary sectional views taken along lines 17—17, 18—18, and 19—19, respectively, of FIG. 16.

It is also possible to assemble two of the knockdown showcases A in endwise abutting relationship to provide a double-length showcase B, substantially as shown in FIG. 15. The only difference between the double-length showcase B and the single-length showcase A, so far as the components are concerned, is that the showcase B does not utilize the left end-frame 1 of one showcase and the right end-frame 2 of the showcase to be attached in side-by-side relationship, but employs a common end-frame 125.

The end-frame 125 comprises a side wall support 126 having a laterally extending flange 127, integrally formed at its lower margin. Welded to the underside of the flange 127 and spaced inwardly from the forward margin thereof is a front leg 129 and welded to the rear vertical margin of the side wall support 126 is a back leg or back upright 130. Similarly welded to the forward margin of the side wall support 126 and terminating at its lower margin, is a front upright 131 which is sized for cooperation with the back upright 130, the upright 131 further being beveled at its upper margin at a 45° angle. Extending between and welded to the back and front uprights 130, 131, is a side rail 132 which is also beveled at its forward margin for cooperation with the beveled end of the upright 131. As in the case of the end frames 1, 2, the leg 129 the uprights 130, 131, and the side rail 132 are preferably fabricated from steel tubing of rectangular cross-section. The uprights 130, 131, are each provided on the left laterally presented side faces (reference being made to FIG. 15) with pairs of vertically aligned, slot-like apertures 133, 134, respectively. The oppositely presented lateral side faces of the uprights 130, 131, are each similarly provided with pairs of vertically aligned slot-like apertures 135, 136, respectively.

Welded or otherwise rigidly secured to each of the laterally presented side faces of the side rails 132 are inverted L-shaped glass-supporting brackets 137, 138, each integrally including a laterally extending glass-supporting flange 139, 140, respectively. Provided for bolted attachment to the side wall support 126 and supported by the outwardly extending flange 127 is a side wall facia board 141 which is substantially identical to the previously described side wall facia board $f$. Bolted to the underside of the side rail 132 and extending lengthwise thereof is a U-shaped glass-supporting channel 142 which is substantially identical in all respects to the previously described glass-supporting channel 14, and provided for bolted attachment to the upper surface of the facia board 141 is a cooperating lower U-shaped glass-supporting channel 143 which is substantially identical to the previously described glass-supporting channel 23. Welded to and extending outwardly from each of the laterally presented side faces of the back upright 130 are tongue-fasteners 144, 145, also preferably formed of steel having a U-shaped cross-section. Finally, glides 147 are inserted in the lower ends of each of the legs 129, 130, and a cap member 148, which is substantially identical to the previously described cap 106, is inserted into the open end of the upright 130. A glass insert 149 is provided for insertion into the end frame 125.

In use, the end frame 125 is employed to connect a showcase A, which is devoid of its right end frame, to the right-hand margin of a second showcase A which is devoid of its left-end frame, substantially to form a showcase B as shown in FIG. 15. The metal clamp-hooks 45, 57, of the facia boards 4, 3, respectively, will engage the slot-apertures 135, 136, in the back and front uprights 130, 131, respectively, while the clamp-hooks 46, 58, of the facia boards 4, 3, forming part of the left showcase will engage the slot-apertures 133, 134, of the uprights 130, 131, respectively. The brackets 76, 79, are attached to each of the laterally presented side faces of the side rail 132 and the front cross-bars 81 are thereupon fastened to the flanges 77, 80. The tongue-fasteners 144, 145, will thereupon engage the open ends of each of the back cross-bars 68 forming part of the left and right showcases. In this connection, it is to be noted that the bases 66 of each section will rest on the base support blocks 65, and the co-planar base support blocks 150, on each side of the facia board 141. After the showcase B is assembled in structural form, the glass insert 149 is then inserted within the glass-supporting channels 142, 143, in the manner previously described in connection with the glass insert 112.

It should be obvious that it is possible to assemble more than two models of the above-described knockdown showcase A in side-by-side relationship to provide plural-length showcases. This arrangement would merely require the use of a plurality of end frames 125 interposed between each of the endwise abutting showcases A.

Figures 20, 21, 22, 23:
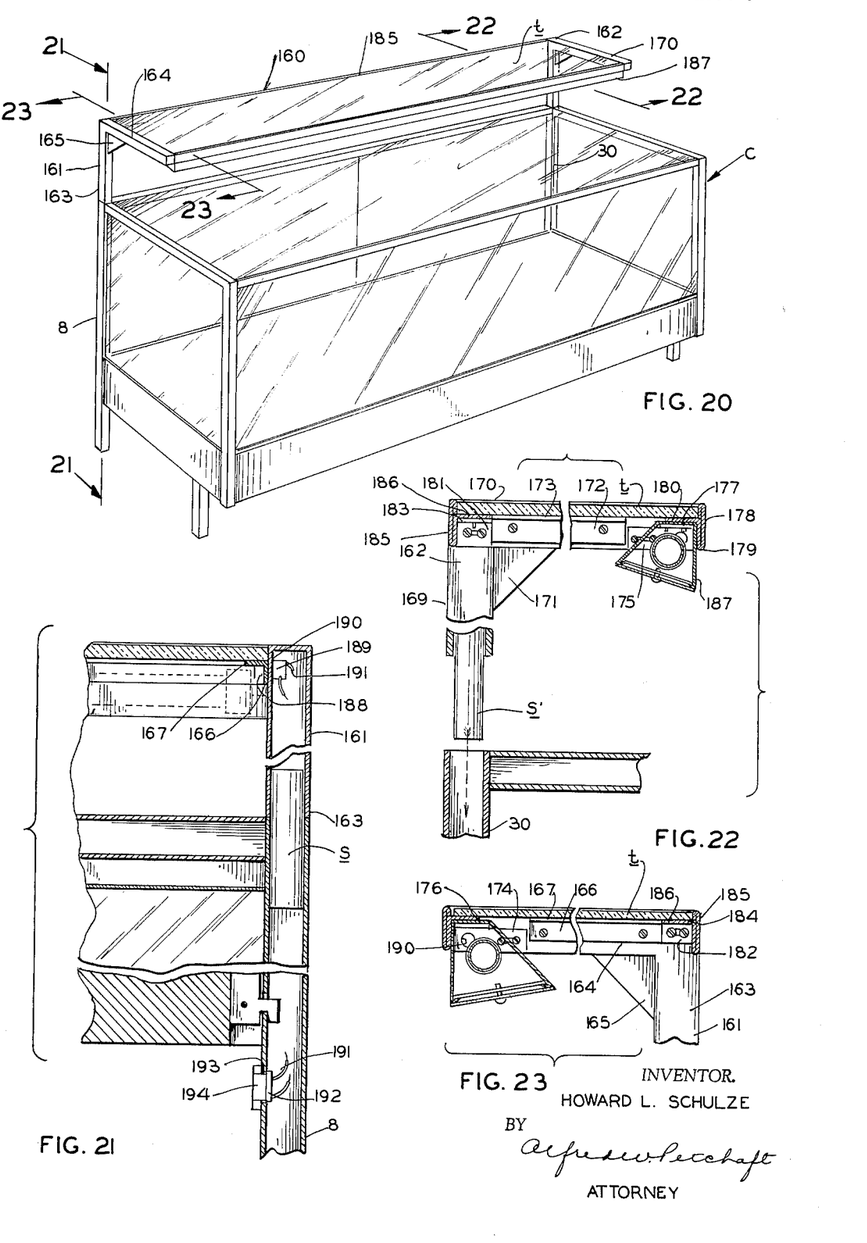
FIG. 20 is a perspective view of a further modified form of display case constructed in accordance with and embodying the present invention.
FIGS. 21, 22, and 23, are fragmentary sectional views taken along lines 21—21, 22—22, and 23—23, respectively, of FIG. 20.

It is possible to provide a further modified form of showcase C, as shown in FIG. 20. The showcase C is substantially identical to the previously described showcase A except that the cap members 106 are removed from the back uprights 8, 30. Provided for removable attachment to the open-ended uprights, 8, 30, is an extension arm 160, which includes a left-end bracket 161 and a cooperating longitudinally spaced right-end bracket 162.

The left-end bracket 161 comprises a vertical support leg 163 which is welded to the underside of a transversely extending arm 164, the transverse distance of which is substantially less than the transverse distance of the showcase A. The arm 164 is reinforced by means of a triangular gusset 165 which is welded to its underside and to the vertical leg 163. Welded to the endwardly presented lateral side face of the arm 164 is an inverted L-shaped glass-supporting bracket 166 which includes an inwardly extending glass-support flange 167 integrally formed at its upper margin. The arm 164 and vertical leg 163 are preferably fabricated from a piece of tubular steel having a rectangular cross-section. Inserted within the open end of the leg 163 and welded thereto is a depending cylindrical support shaft $s$.

The right-end bracket 162 is substantially identical with the left-end bracket 161 and is, in effect, a mirror image thereof and includes a vertical support leg 169 which is welded to the underside of a transversely extending arm 170. Welded to the underside of the arm 170 and to the leg 169 is a triangular gusset 171, and welded to the inwardly presented side face of the arm 170 is an L-shaped glass-support bracket 172 which includes an integrally formed inwardly extending glass-support flange 173. Inserted within the open end of the leg 169 and welded thereto is a cylindrical support shaft $s'$.

Rigidly secured to the inwardly presented side faces of each of the arms 164, 170, adjacent the forward margins thereof are cross-bar support brackets 174, 175, including inwardly extending flanges 176, 177, respectively. Extending between and secured to each of the flanges 176, 177, is a front cross-bar 178, preferably formed of steel having a T-shaped cross-section, substantially similar in all respects to the previously described front cross-bar 81 and which includes a vertical plate 179 and a centrally located inwardly extending glass shelf support flange 180, integrally formed on the plate 179.

Rigidly secured in the inwardly presented lateral faces of the arms 164, 170, adjacent their rearward margin, are cross-bar support brackets 181, 182, each including integrally formed inwardly extending flanges 183, 184, respectively, and which are substantially identical to the previously described cross-bar support brackets 174, 175. Rigidly secured to each of the cross-bar support brackets 181, 182, is a back cross-bar 185 integrally including an inwardly extending glass shelf support flange 186, the back cross-bar 185 being substantially identical to the previously described front cross-bar 178.

Sized for disposition between the cross-bars 178, 185, and the support arms 164, 170, is a top shelf $t$ preferably formed of glass and which is supported by each of the inwardly extending flanges 167, 173, 186, and 180.

Provided for removable attachment to the underside of the flange 180 is a light bar 187, which is substantially identical to the previous described light bar 86 and includes a connector plug 188, which is adapted to be inserted in a socket 189, formed within an aperture 190 of the inwardly presented lateral side face of the support arm 164. The support arm 164 is further internally wired with conductors 191 which extend downwardly in the tubular leg 163. Tubular leg 163 is provided with a contactor plug 192 at its lower end.

It should be obvious that the various disassembled components of the showcase C can be packaged and stored in a compact unit, the various components being comparatively light in weight and having rather small sizes. When it is desired to assemble the knockdown showcase C, the showcase A is assembled as previously described without the end caps 106 in each of the uprights 8, 30. The extension arm 160 can be assembled as a separate unit by securing the brackets 174, 175, to the inwardly presented lateral faces of the support arms 164, 170, respectively, adjacent their forward margins. The cross-bar 178 is then secured to the flanges 176, 177, forming part of the brackets 174, 175, respectively. Similarly, the cross-bar support brackets 181, 182, are secured to the inwardly presented transverse lateral side faces of the arms 164, 170, adjacent their rearward margins and the back cross-bar 185 is rigidly secured to the inwardly extending flanges 183, 184, respectively. The plug 188 is inserted into the socket 190 and the glass top shelf *t* is thereupon placed on the assembled frame and supported by the flanges 167, 173, 180, and 186. The support shafts *s*, *s'*, are thereupon inserted into the open ends of the uprights 8, 30, until the lower margin of the legs 163, 169, abut the top edge face of each of the uprights 8, 30, respectively. The conductor wire 191 is wired through the tubular upright 8 and the plug 192 withdrawn therefrom through an aperture 193, formed at the lower portion of the upright 8. Thereupon, the plug 192 is inserted into a double junction socket 194, which also accommodates the plug 100. It can thus be seen that electrical current will be supplied to the light bar 187 when the conductor 101 is connected to some suitable source of electrical current.

It, of course, should be understood, that the sequence of assembly operations in connection with the extension arm 160 can be varied according to the convenience of the person doing the assembly work. It is not essential that the above-described sequence of assembly be followed in a precise order as described.

It should be understood that changes and modifications in the form, construction, arrangement, and combination of the several parts of the knockdown showcases can be made and substituted for those herein shown and described without departing from the nature of my invention.

Having thus described my invention, what I claim and desire to secure by Letters Patents is:

1. A knockdown display case comprising a plurality of rigid preassembled planar end frames, respectively having flat faces adapted for upright inwardly presented opposed disposition when the frames are in assembled position, and each being provided in such faces with front and rear sets of apertures, front and rear facia boards each having oppositely presented lateral faces, and hook-like elements mounted in and projecting beyond the end faces of each of said facia boards and being adapted for locking engagement in said apertures whereby to rigidly interconnect the end frames, each of said end frames, in turn, being releasably engaged with cross-bars which are located in parallel relation to each of said front and rear facia boards so that the end frames are thus interconnected in the form of an upright rectilinear enclosure.

2. A knockdown display case comprising a plurality of rigid preassembled planar end frames, respectively having flat faces adapted for upright inwardly presented opposed disposition when the frames are in assembled position, and each being provided in such faces with front and rear sets of apertures, front and rear facia boards each having oppositely presented lateral faces, hook-like elements mounted in and projecting beyond the end faces of each of said facia boards and being adapted for locking engagement in said apertures whereby to rigidly interconnect the end frames, each of said end frames, in turn, being releasably engaged with cross-bars which are located in parallel relation to each of said front and rear facia boards so that end frames are thus interconnected in the form of an upright rectilinear enclosure, end-support means on at least some of the cross-bars, and at least one transparent panel held by said support means so as to form a display window across a portion of the display case.

3. A knockdown display case comprising a pair of spaced parallel end rigid preassembled frames each consisting of a pair of uprights having polygonal cross-section, uprights respectively having flat faces adapted for upright inwardly presented opposed disposition when the upright is in assembled position, and being provided in such faces with a plurality of apertures, a pair of facia boards each having oppositely presented lateral faces, and hook-like elements mounted in and projecting beyond the end faces of each of said boards and being adapted for locking engagement in said apertures whereby to rigidly interconnect the end frames, said uprights, in turn, being connected by at least two additional facia boards, forming part of said rigid end frames, so that the end frames are thus interconnected in the form of an upright enclosure.

4. A knockdown display case comprising a pair of spaced parallel end rigid preassembled frames each consisting of a pair of uprights having polygonal cross-section, said uprights respectively having flat faces adapted for upright inwardly presented opposed disposition when the upright is in assembled position, and being provided in such faces with a plurality of apertures, a pair of facia boards each having oppositely presented lateral faces, hook-like elements mounted in and projecting beyond the end faces of each of said boards and being adapted for locking engagement in said apertures whereby to rigidly interconnect the end frames, each of said uprights, in turn, being connected by at least two additional facial boards, so that the end frames are thus interconnected in the form of an upright enclosure, and end panels removably disposed in said end frames.

5. A knockdown display case comprising a pair of spaced parallel end rigid preassembled frames each consisting of a pair of uprights having polygonal cross-section, said uprights respectively having flat faces adapted for upright inwardly presented opposed disposition when the upright is in assembled position, and being provided in such faces with a plurality of apertures, a pair of facia boards each having oppositely presented lateral faces, hook-like elements mounted in and projecting beyond the end faces of each of said boards and being adapted for locking engagement in said apertures whereby to rigidly interconnect the end frames, each of said uprights, in turn, being connected by at least two additional facia boards forming part of said rigid end frames, so that the end frames are thus interconnected in the form of an upright enclosure, and a bottom panel disposed in and extending across said enclosure.

6. A knockdown display case comprising a pair of spaced parallel end frames each consisting of a pair of uprights having polygonal cross-section, said uprights respectively having flat faces adapted for upright inwardly presented opposed disposition when the upright is in assembled position, and being provided in such faces with a plurality of apertures, a pair of facia boards each having oppositely presented lateral faces, hook-like elements mounted in and projecting beyond the end faces of each of said boards and being adapted for locking engagement in said apertures whereby to rigidly interconnected the end frames, each of said uprights, in turn, being connected by at least two additional facia boards, so that the end frames are thus interconnected in the form of an upright enclosure, a bottom panel removably disposed in and extending across said enclosure, and end panels removably disposed in said end frames.

7. A knockdown display case comprising a plurality of rigid preassembled planar end frames, respectively having flat faces adapted for upright inwardly presented opposed disposition when the frames are in assembled position, and being provided in such faces with front and rear sets of apertures, front and rear facia boards each having oppositely presented lateral faces, hook-like elements mounted in and projecting beyond the end faces of each of said facia boards and being adapted for locking engagement in said apertures whereby to rigidly interconnect the end frames, each of said end frames, in turn, being releasably engaged with cross-bars which are located in parallel relation to each of the front and rear facia boards so that the end frames are thus interconnected in the form of an upright rectilinear enclosure, end panels removably disposed in said end frames and end frame facia boards rigidly disposed within said end frames, and having their upper margins co-planar with the upper margins of the front and rear facia boards.

8. A display case according to claim 1, which is characterized in that the forwardmost cross-bar has a T-shaped cross-section and that an illuminator is operatively attached to said T-shaped cross-bar and extends transversely between said end frames in proximate parallel relation to said T-shaped cross-bar.

9. A display case according to claim 2, which is characterized in that the forwardmost cross-bar has a T-shaped cross-section and that an illuminator is operatively attached to said T-shaped cross-bar and extends transversely between said end frames in proximate parallel relation to said T-shaped cross-bar.

10. A display case according to claim 7, which is characterized in that an illuminator extends transversely between said end frames in proximate parallel relation to one of the cross-bars.

11. A knockdown display case comprising a pair of planar end frames integrally including a front upright, a rear upright, a top bar, and a bottom bar, all of which initially define an open space, said top and bottom bars having facing elongated grooves, a space-closing panel mounted in said grooves, said front and rear uprights respectively having flat faces adapted for upright inwardly presented opposed disposition when the end frames are in assembled position, and being provided in such faces with a plurality of apertures, front and rear facia boards each having oppositely presented lateral faces, hook-like elements mounted in and projecting beyond the end faces of each of said facia boards and being adapted for locking engagement in said apertures whereby to rigidly interconnect the end frames, an elongated cross-bar connected at its ends to and extending between the upper portions of the rear uprights, a T-shaped cross-bar connected at its ends to and extending horizontally between the upper portions of the front uprights so that the end frames are thus interconnected in the form of an upright enclosure, and a bottom panel disposed in and extending across said enclosure.

12. A display case according to claim 11 in which at least one upright and one bar of an end frame are hollow and contain electrical conductors, a light source mounted on and carried by the T-shaped cross-bar and complementary electrical socket means formed on the matching internal faces of the light source and one end frame, said light source being connected to a source of electrical power through said electrical conductors.

13. A display case according to claim 11 in which the rear uprights are hollow and are provided with removable caps, said uprights being adapted, upon removal of the caps, to form upwardly opening sockets, and the display case is, furthermore, provided with shelf-supporting bracket means removably mounted in said sockets.

14. A display case according to claim 13 in which the shelf supporting bracket means is a pair of L-shaped brackets having depending members adapted to fit snugly within such sockets, horizontally extending cross-members rigidly connected at their ends to the brackets, whereby said brackets are interconnected to provide a horizontal supporting structure, and shelf means mounted on said supporting structure.

15. A display case according to claim 11 in which the rear uprights are hollow and are provided with removable caps, said uprights being adapted, upon removal of the caps, to form upwardly opening sockets, and the display case is, furthermore, provided with shelf-supporting bracket means removably mounted in said sockets, and a light source mounted on and carried by the shelf-supporting bracket means.

16. A knockdown display case comprising a plurality of rigid preassembled planar end frames, respectively having flat faces adapted for upright inwardly presented opposed disposition when the frames are in the assmbled position, and being provided in such faces with front and rear sets of apertures, front and rear facia boards each having oppositely presented lateral faces, hook-like elements mounted in and projecting beyond the end faces of each of said facia boards and being adapted for locking engagement in said apertures whereby to rigidly interconnect the end frames, each of said end frames, in turn, being releasably engaged with cross-bars which are located in parallel relation to each of the front and rear facia boards so that the end frames are thus interconnected in the form of an upright rectilinear enclosure, one of said cross-bars having inwardly extending socket portions at its transverse ends, a pair of laterally projecting connector elements extending from the end frames and being adapted to snugly fit within the socket portion of said last-named cross-bar when attached to said end frames, end panels removably disposed in said end frames, and end frame facia boards rigidly disposed within said end frames, and having their upper margins co-planar with the upper margins of the front and rear facia boards.

17. A knockdown display case comprising a plurality of rigid preassembled planar end frames, respectively having flat faces adapted for upright inwardly presented opposed disposition when the frames are in assembled position, and being provided in such faces with front and rear sets of apertures, front and rear facia boards each having oppositely presented lateral faces, hook-like elements mounted in and projecting beyond end faces of each of said facia boards and being adapted for locking engagement in said apertures whereby to rigid interconnect the end frames, each of said end frames, in turn, being releasably engaged with cross-bars which are located in parallel relation to each of the front and rear facia boards so that the end frames are thus interconnected in the form of an upright box-like enclosure, one of said cross-bars having inwardly extending socket portions at its ends, a pair of laterally projecting connector elements extending from the end frames and being adapted to snugly fit within the socket portion of said last-named cross-bar when attached to said end frames, end panels removably disposed in said end frames, end frame facia boards rigidly disposed within said end frames, and having their upper margins co-planar with the upper margins of the front and rear facia boards, lying in the same horizontal plane as the front and rear facia boards, matching channel-forming means rigidly secured to the undersurface of said cross-bars and the upper surfaces of said front and rear facia boards, and transparent panels removably disposed in said channel-forming means.

18. A knockdown display device comprising at least one preassembled planar middle frame, said middle frame having oppositely presented parallel flat faces and adapted for upright disposition when in an assembled position, said middle frames, if more than one, being provided in such faces with sets of front and rear apertures, a plurality of preassembled planar end frames being adapted for upright disposition when the frames are in assembled position, said end frames having flat faces and being provided in such faces with front and rear sets of apertures, a plurality of front and rear facia boards, each having oppositely presented lateral faces, and hook-like elements mounted in and projecting beyond each of the lateral faces of each facia board, the hook-like elements of one front and one rear facia board being adapted for locked engagement in the front and rear apertures of one of said end frames and in the front and rear apertures of one face of one of said middle frames, the hook-like elements of another of said front and rear facia boards being adapted for locking engagement in the oppositely presented apertures of said middle frame and in the apertures of one of said end frames, each of said middle and end frames, in turn, being releasably engaged with cross-bars so that the middle and end frames are thus interconnected in the form of an upright rectilinear enclosure.

(References on following page)

References Cited by the Examiner

UNITED STATES PATENTS

| | | | |
|---|---|---|---|
| 335,360 | 2/1886 | Jenkens | 5—99.2 X |
| 543,422 | 7/1895 | Ernest | 20—3 |
| 670,978 | 4/1901 | Young | 248—140 |
| 713,534 | 11/1902 | Thurnau | 312—107 X |
| 845,652 | 2/1907 | La Berge | 312—114 X |
| 899,173 | 9/1908 | Linden | 5—298 X |
| 1,063,086 | 5/1913 | Tietz | 312—114 X |
| 1,714,233 | 5/1929 | Morris | 312—140 |
| 2,172,266 | 9/1939 | Whitaker | 312—107 X |
| 2,463,128 | 3/1949 | Vanderveld | 312—114 |
| 2,643,170 | 6/1953 | Vanderveld | 312—108 |
| 2,980,285 | 4/1961 | Parsons | 220—84 |
| 3,004,814 | 10/1961 | Schulze | 312—257 X |
| 3,008,741 | 11/1961 | McCormack | 312—140 |
| 3,044,656 | 7/1962 | Combs | 217—69 X |

FOREIGN PATENTS

| | | |
|---|---|---|
| 28,150 | 6/1956 | Finland. |
| 574,703 | 1/1946 | Great Britain. |
| 581,810 | 9/1958 | Italy. |
| 301,980 | 12/1954 | Switzerland. |

FRANK B. SHERRY, *Primary Examiner.*

CHANCELLOR E. HARRIS, *Examiner.*